United States Patent
Patil et al.

(10) Patent No.: US 8,892,717 B2
(45) Date of Patent: Nov. 18, 2014

(54) ADAPTIVE ASSET INFORMATION COLLECTION AND STORAGE

(75) Inventors: Umesh Patil, Cupertino, CA (US); Varma Bhupatiraju, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 914 days.

(21) Appl. No.: 12/135,542

(22) Filed: Jun. 9, 2008

(65) Prior Publication Data

US 2009/0307346 A1    Dec. 10, 2009

(51) Int. Cl.
*G06F 15/173* (2006.01)
*H04L 12/26* (2006.01)
*H04L 12/24* (2006.01)
*G06F 11/30* (2006.01)
*H04L 29/08* (2006.01)
*G06F 11/34* (2006.01)
*G06F 11/26* (2006.01)
*G06F 3/06* (2006.01)

(52) U.S. Cl.
CPC .......... *H04L 43/0817* (2013.01); *H04L 41/069* (2013.01); *H04L 41/0695* (2013.01); *H04L 43/00* (2013.01); *H04L 67/24* (2013.01); *H04L 12/2602* (2013.01); *G06F 11/3055* (2013.01); *G05F 11/3079* (2013.01); *G06F 11/3476* (2013.01); *G06F 11/26* (2013.01); *G06F 3/0653* (2013.01); *G06F 11/3006* (2013.01); *H04L 12/24* (2013.01); *H04L 41/00* (2013.01)
USPC .......................................... 709/224; 709/203

(58) Field of Classification Search
CPC ..... H04L 12/24; H04L 12/2602; H04L 41/00; H04L 43/00; H04L 43/0817; H04L 67/24; H04L 41/069; H04L 41/0695; G06F 11/3476; G06F 11/26; G06F 11/3006; G06F 11/3055; G06F 11/3079; G06F 3/0653
USPC .......................... 709/202, 223–224, 232, 203
See application file for complete search history.

(56) References Cited

U.S. PATENT DOCUMENTS

| | | | |
|---|---|---|---|
| 5,768,614 A * | 6/1998 | Takagi et al. | 710/1 |
| 6,505,248 B1 * | 1/2003 | Casper et al. | 709/224 |
| 7,091,846 B2 * | 8/2006 | Wu | 340/506 |
| 7,152,178 B1 * | 12/2006 | Vook et al. | 714/4 |
| 7,913,105 B1 * | 3/2011 | Ganesh et al. | 709/224 |
| 2003/0014515 A1 * | 1/2003 | Motoyama et al. | 709/224 |
| 2003/0055883 A1 * | 3/2003 | Wiles, Jr. | 709/203 |
| 2003/0174162 A1 * | 9/2003 | Wu | 345/736 |
| 2005/0010461 A1 * | 1/2005 | Manos | 705/8 |
| 2005/0111378 A1 * | 5/2005 | Chen et al. | 370/252 |
| 2006/0171330 A1 * | 8/2006 | Mandrell et al. | 370/254 |
| 2007/0220133 A1 * | 9/2007 | Park | 709/224 |
| 2008/0220869 A1 * | 9/2008 | Midgley et al. | 463/40 |
| 2009/0009343 A1 * | 1/2009 | Boyer et al. | 340/573.1 |
| 2009/0138566 A1 * | 5/2009 | Ito et al. | 709/206 |

(Continued)

*Primary Examiner* — Oleg Survillo
(74) *Attorney, Agent, or Firm* — Wong, Cabello, Lutsch, Rutherford & Brucculeri, L.L.P.

(57) ABSTRACT

A network management device which registers for any state change notifications from the devices in the network. The network management device updates its status and values of the devices associated with each state change notification by querying the device. In this manner the management device can make a more timely update for a particular device and need not keep querying devices that have not changed, thus eliminating many unnecessary transactions. In certain embodiments polling is still performed. As a result, the management device is both more current in its displayed data and has fewer network transactions.

37 Claims, 7 Drawing Sheets

(56) References Cited

U.S. PATENT DOCUMENTS

| | | | |
|---|---|---|---|
| 2009/0299698 A1* | 12/2009 | Burke et al. | 702/186 |
| 2011/0131191 A1* | 6/2011 | Szyperski et al. | 707/702 |
| 2012/0011173 A1* | 1/2012 | Ohata et al. | 707/812 |
| 2013/0185593 A1* | 7/2013 | Taylor et al. | 714/37 |

* cited by examiner

ADAPTIVE ASSET INFORMATION COLLECTION AND STORAGE

FIELD OF THE INVENTION

The present invention relates to systems and methods for managing network devices. More specifically, this invention relates to improving updating of device status in a management program.

BACKGROUND

The number of devices connected in a network continues to expand. With this expansion, management of the devices, both connected nodes and the switches forming the fabric becomes more difficult.

The Fibre Channel (FC) protocol is a switched communications protocol that allows concurrent communication among servers, workstations, storage devices, peripherals, and other computing devices. Fibre Channel can be considered a channel-network hybrid, containing enough network features to provide the needed connectivity, distance and protocol multiplexing, and enough channel features to retain simplicity, repeatable performance and reliable delivery. Fibre Channel is capable of full-duplex transmission of frames at rates currently extending from 1 Gbps (Gigabits per second) to 10 Gbps or more. It is also able to transport commands and data according to existing protocols, most commonly Small Computer System Interface (SCSI) in the form of FCP.

In a typical usage, Fibre Channel is used to connect one or more computers or workstations together with one or more storage devices. In the language of Fibre Channel, each of these devices is considered a node. One node can be connected directly to another, or can be interconnected such as by means of a Fibre Channel fabric. The fabric can be a single Fibre Channel switch, or a group of switches acting together. Technically, the N_port (node ports) on each node are connected to F_ports (fabric ports) on the switch. Multiple Fibre Channel switches can be combined into a single fabric. The switches connect to each other via E_Port (Expansion Port) forming an interswitch link, or ISL. The fabric can be divided or arranged both physically and virtually into one or more groupings, with each grouping operating according to its own rules, protocols, permissions, etc.

Network management devices are used to monitor status of the various network devices and to perform configuration options. In many instances the network management device is a workstation connected to the network devices and running management software. The management software communicates with the various devices, stores relevant information, such as various device parameters and statistics, and provides a user interface, usually a graphical user interface (GUI) for ease of use by the system administrators. Using the GUI the administrator can easily determine network topology, status on the devices and links in the network and change device configuration. To obtain the network device information the management software polls each network device periodically and requests the desired information, which is then stored and any updates made to the GUI.

As the fabric grows larger and is divided into more and more groupings of various types, the total parameters used to define interconnections, security settings, etc. become large, making management of the network more complicated. As the number of devices is growing, polling is reaching its limits. The number of transactions needed to keep the management device current becomes prohibitively expensive in terms of time and bandwidth. What is needed is a technique that allows a management device to be current on the status of devices in the network without the overheads associated with polling the devices to obtain all information.

SUMMARY OF THE INVENTION

The foregoing needs are met, to a great extent, by embodiments according to the present invention, wherein a network management device registers for any state change notifications from the devices in the network. The network management device updates its status and values of the devices associated with each state change notification by querying the device. In this manner the management device can make a more timely update for a particular device and need not keep querying devices that have not changed, thus eliminating many unnecessary transactions. In certain embodiments polling is still performed. As a result, the management device is both more current in its displayed data and has fewer network transactions.

The figures depict a preferred embodiment of the invention for purposes of illustration only. One skilled in the art will readily recognize from the following discussion that alternative embodiments of the structures and methods illustrated herein may be employed without departing from the principles of the invention described herein.

DETAILED DESCRIPTION

Reference in the specification to "one embodiment" or to "an embodiment" means that a particular feature, structure, or characteristic described in connection with the embodiments is included in at least one embodiment according to the invention. The appearances of the phrase "in one embodiment" in various places in the specification are not necessarily all referring to the same embodiment.

Some portions of the description that follow are presented in terms of algorithms and symbolic representations of operations on data bits within a computer memory. These algorithmic descriptions and representations are the means used by those skilled in the art to most effectively convey the substance of their work to others skilled in the art. Generally, an algorithm is a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like refer to the action and processes of a computer system or a similar electronic computing device that manipulates and transforms data represented as physical (electronic) quantities within the computer system memories or registers (or other such information storage, transmission or display devices).

Figure 1:
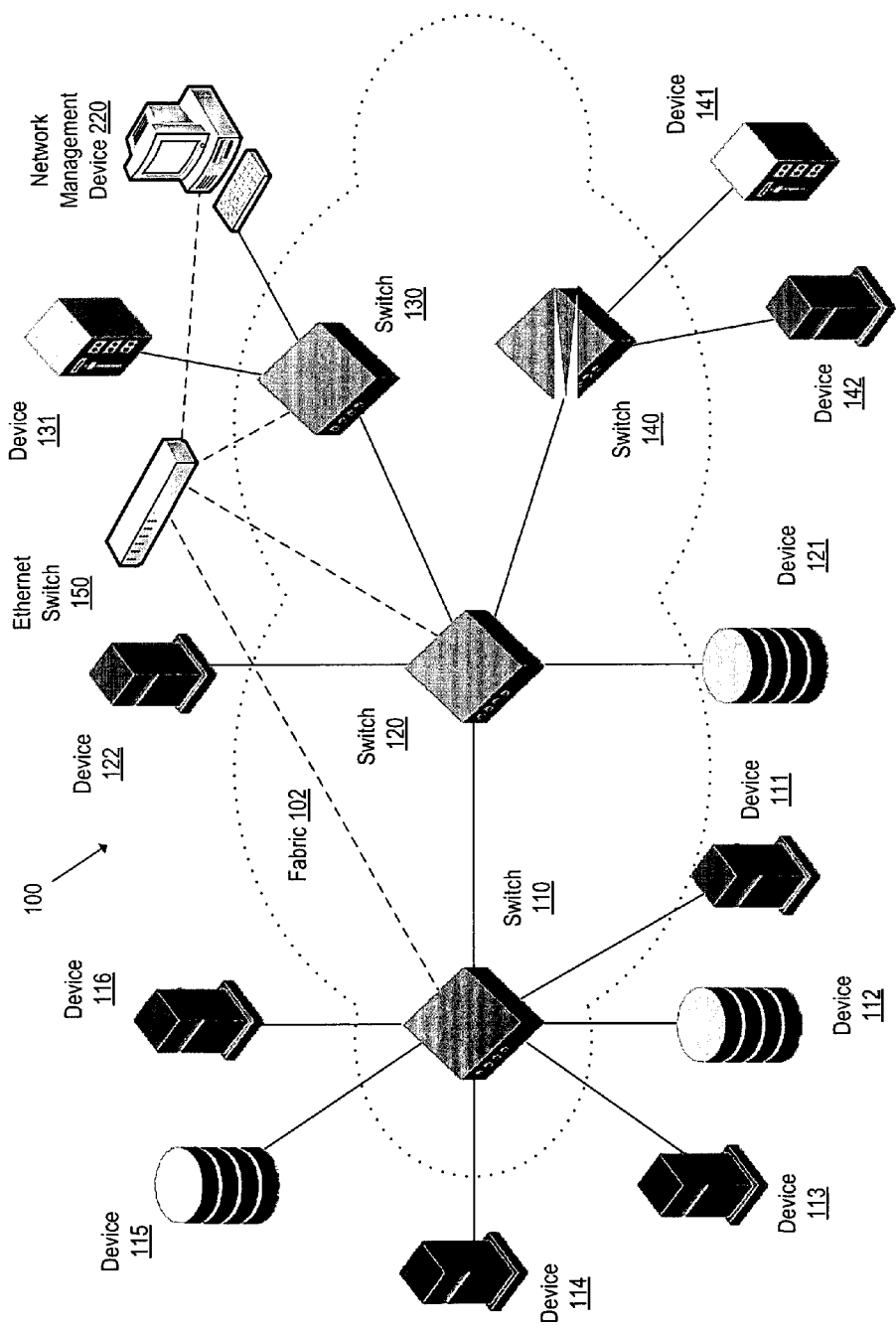
FIG. 1 is a block diagram of a network having multiple devices coupled through a fabric, including a network management device, according to an embodiment of the present invention.

The present invention is best understood after examining the major components of a Fibre Channel network, such as network 100 shown in FIG. 1. The components shown in FIG. 1 are helpful in understanding the applicant's preferred embodiment, but persons of ordinary skill will understand that the present invention can be incorporated in networks of a variety of configurations.

FIG. 1 shows a Fibre Channel network 100 in accordance with an embodiment of the invention. Generally, the network 100 is connected using Fibre Channel connections. For illustrative purposes in FIG. 1, the network 100 includes a fabric 102 comprised of four different Fibre Channel (FC) switches 110, 120, 130, and 140, though fewer or greater switches can be used to form a fabric. Further, although a Fibre Channel network 100 is illustrated in FIG. 1 for purposes of example, it will be understood that embodiments of the invention may similarly apply to any network protocol (e.g., Ethernet, wireless, etc.).

Each FC switch 110, 120, 130, 140 is connected to one or more devices 111-116, 121, 122, 131, 141, 142, also known as nodes as discussed above. In the illustrated embodiment devices 111, 113, 114, 116, 122 and 142 are servers or hosts; devices 112, 115 and 121 are disk storage units and devices 131 and 141 are tape units. While each switch is shown for illustrative purposes as having at least one point-to-point device connected, any number of point-to point or arbitrated loop devices may be connected. Further, it is not necessary that all of the switches have devices attached, but may be connected to other switches. A network management device 220 is illustrated as connected to the switch 130. Further shown is a local area network (LAN) using an Ethernet switch 150 connected to FC switches 110, 120, 130 and 140 and to the network management device 220. This is a conventional method where the various FC switches are controlled and managed using the out-of-band LAN rather than utilize in-band Fibre Channel management commands.

In the various embodiments of the present invention, the term "asset" is used to refer to physical devices as well as relational artifacts. The physical devices include nodes, switches, etc. The relational artifacts include zones, Admin Domains (AD), MetaSAN information, etc. Zones are conventional Fibre Channel elements. Admin Domains are used by Brocade Communications, Inc. switches to develop virtual fabrics, which is physical fabric logically segregated into various separate logical or virtual fabrics or LSANs. A MetaSAN is the collection of all devices, switches, edge and backbone fabrics, LSANs and routers that make up a physically connected but logically partitioned network. MetaSAN information is then the information about the MetaSAN. One of ordinary skill in the art will recognize that the embodiments of the present invention are readily modified to implement the present invention for these and other assets.

Figure 2:
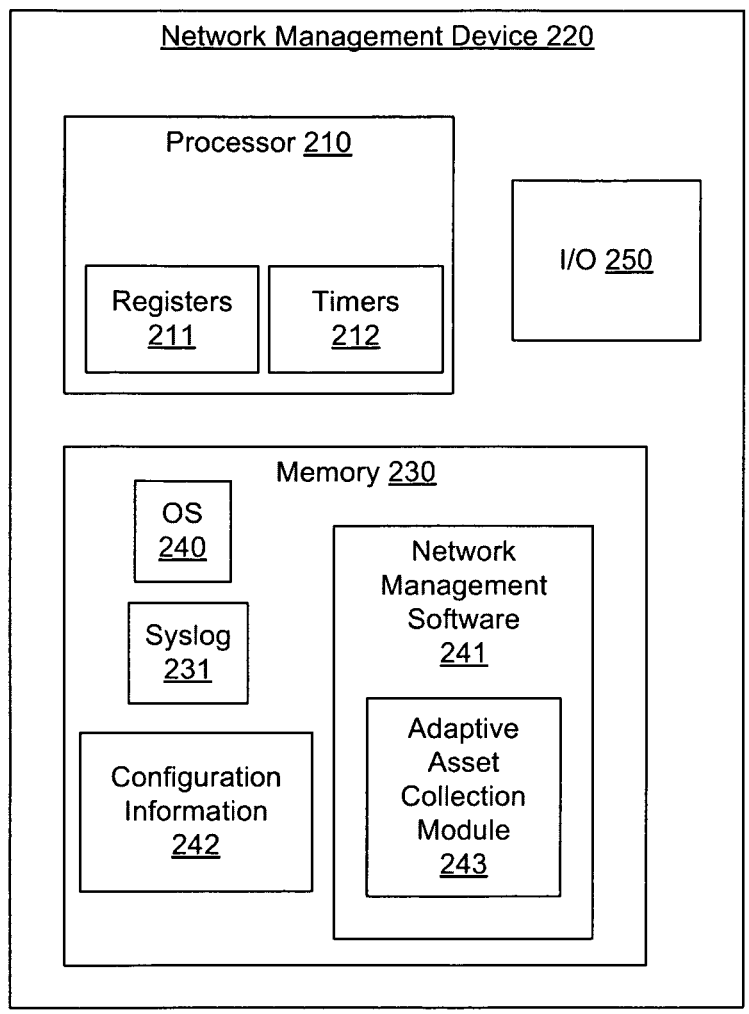
FIG. 2 is a block diagram showing physical details of an embodiment of the network management device of FIG. 1.

Turning now to FIG. 2, a block diagram showing details of an embodiment of the network management device 220 of is shown. In the illustrated embodiment, the network management device 220 includes a processor 210, a memory 230, and communication logic (I/O) 250, which preferably include both Ethernet via or network internal card and Fibre Channel via a host bus adapter. The processor 210 includes logic (inherent and not separately shown), registers 211, and timers 212. The memory 230 is shown storing an operating system (OS) 240, a syslog 231, network management software 241, and configuration information 242. The network management software 241 contains an adaptive asset collection module 243. The processor 210 is coupled with the memory 230 and I/O 250 as is well-known in the art. The OS 540 may be a general purpose OS as desired.

The network management device 220 preferably is a dedicated device or a general purpose computer configured to perform network management, but may also be a part of a switch. The registers 211 and timers 212 may be used to store or determine the start time and the end time. The configuration information 242 may include the stored configuration information 305 and/or the current asset information 335.

Figure 3:
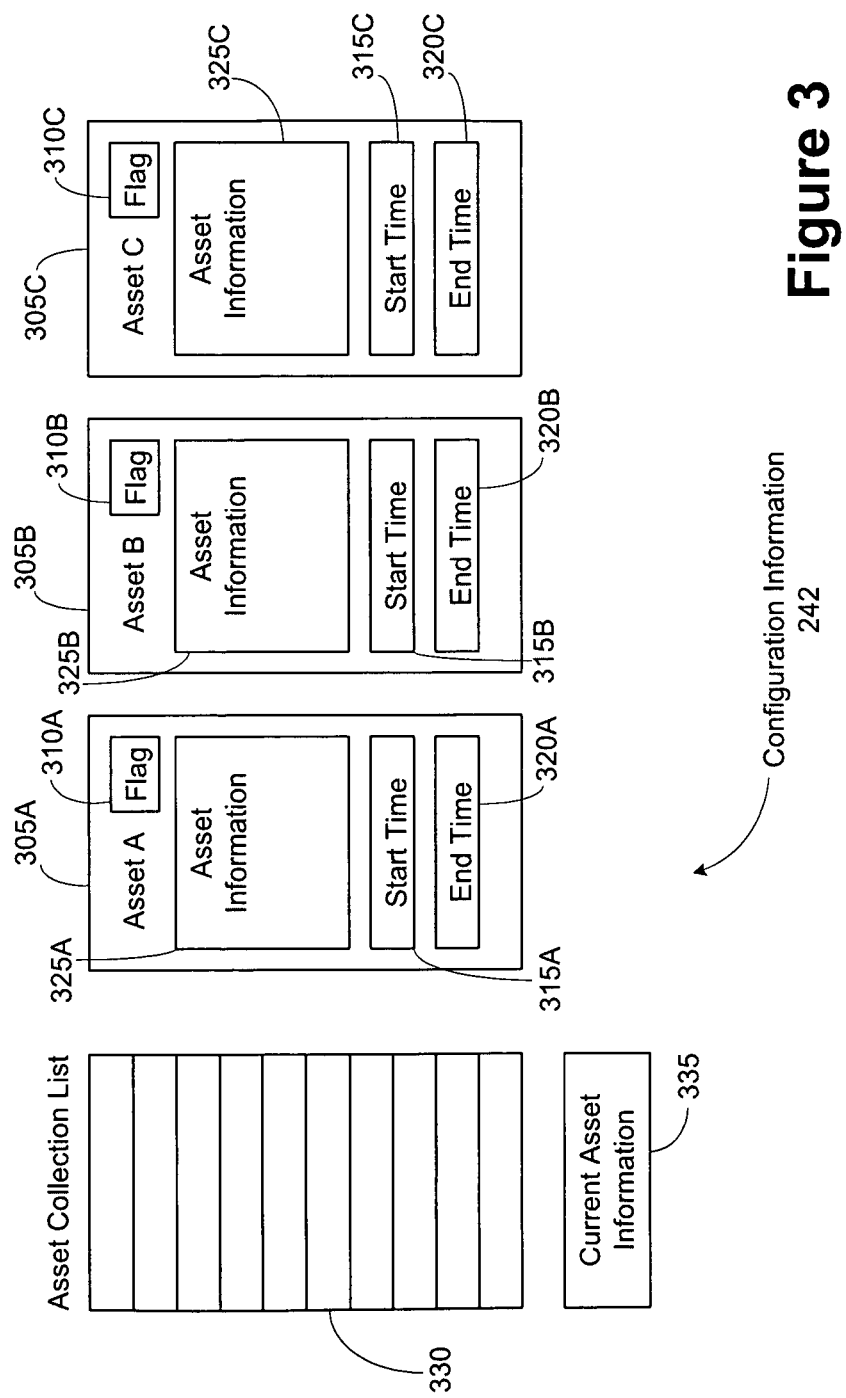
FIG. 3 is a block diagram showing an embodiment of the configuration information of FIG. 2.

FIG. 3 is a representation of the configuration information. There are a plurality of stored asset information blocks 305A-C. Preferably there is one asset block for each particular asset being managed. Each block 305 includes a changed flag 310, a collection start time value 315, a collection end time value 320 and the relevant stored asset information 325. The asset information 325 varies based on asset type. For example, for switches the information can include status of the switch; each port and each connected link; neighbor information for each link; statistics for the switch, ports and links; switch unit information such as type, model, etc; Fibre Channel IDs and WWNs; etc. For relational artifacts, such as zone, AD and metaSAN information, the information can include object hierarchies as discussed below.

An asset collection list 330 is provided to list assets for which the collection process has been determined to be needed. A current asset information block 335 is used to temporarily store asset information read from the current asset whose information is being collected.

Figure 4A:
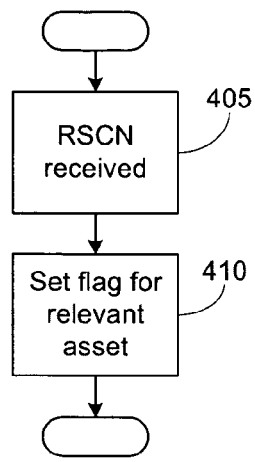
FIGS. 4A and 4B are flowcharts illustrating how flags are set, according to various embodiments of the present invention.

FIG. 4A illustrates a first method to determine asset collection may be indicated. In step 405 an RSCN is received by the network management device 220. As part of the adaptive asset collection process the network management device 220 has registered to receive state change notifications from each device on the network. The state change notification protocol is a process in Fibre Channel where devices can register with the fabric to receive messages, RSCNs, whenever a designated device has a state change. By registering for all devices in the network, the network management device 220 will then be promptly notified whenever a device has a state change. In step 410 the RSCN is parsed to determine the asset which had the state change and the flag 310 for that asset is set.

Figure 4B:
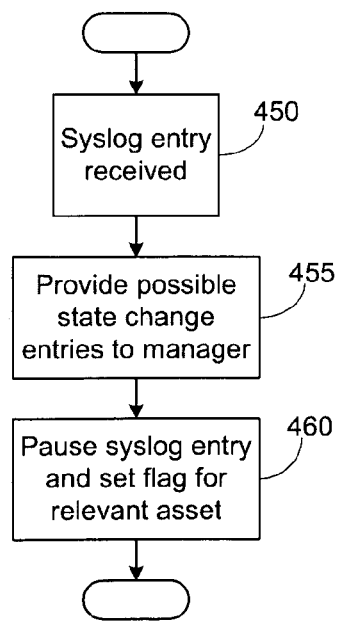

FIG. 4B illustrates a second method to determine the need for asset collection. In step 450 a syslog 231 entry is received by the network management device 220. Selected switches may be configured to provide selected information to the syslog 231 to allow administration of the network. This information can include state change related information so it forms a second avenue to detect state changes. In step 455 a syslog manager reviews the received entry and determines if any modules may be interested in the entry. For any potential state changes, they are forwarded to the adaptive asset collection module 243. That module 243 in step 460 parses the syslog entry to determine if it is a proper entry, and if so, sets the flag 310 for the relevant asset 305.

Figure 5A:
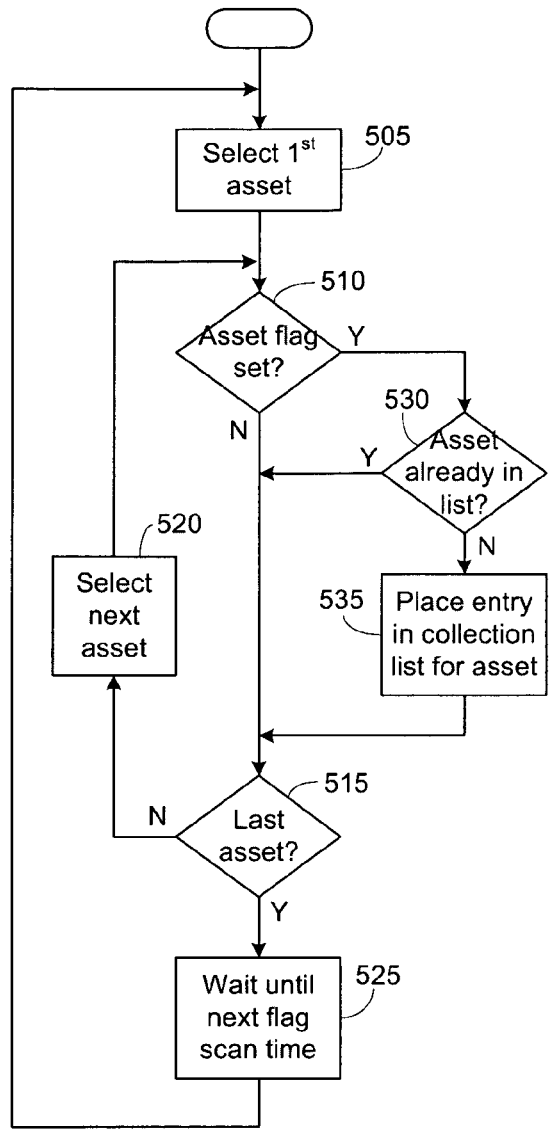
FIGS. 5A, 5B and 5C are flowcharts illustrating an asset collection process according to various embodiments of the present invention.

FIG. 5A illustrates the state change responsive portion of the adaptive asset collection module 243. In step 505 the first asset is selected. In step 510 it is determined if the flag 310 for that asset is set. If not, indicating no RSCNs or syslog entries for that asset have been received, control to proceeds to step 515 to determine if the last asset was checked. If not, in step 520 the next asset is selected and control returns to step 510. If it was the last asset, control proceeds to step 525, where operation waits for a relatively short time, such as three minutes. This interval is the change scan time and is preferably set at a short interval to allow close to real time asset collection. When the time period has elapsed, control returns to step 505.

If in step 510 the flag 310 was set, control proceeds to step 530 to determine if the asset is already present in the asset collection list 330. If so, the information of the asset is already scheduled for collection and control proceeds to step 515. If the asset is not in the list, in step 535 an entry for the asset is placed in the asset collection list 330.

Figures 5B, 5C:
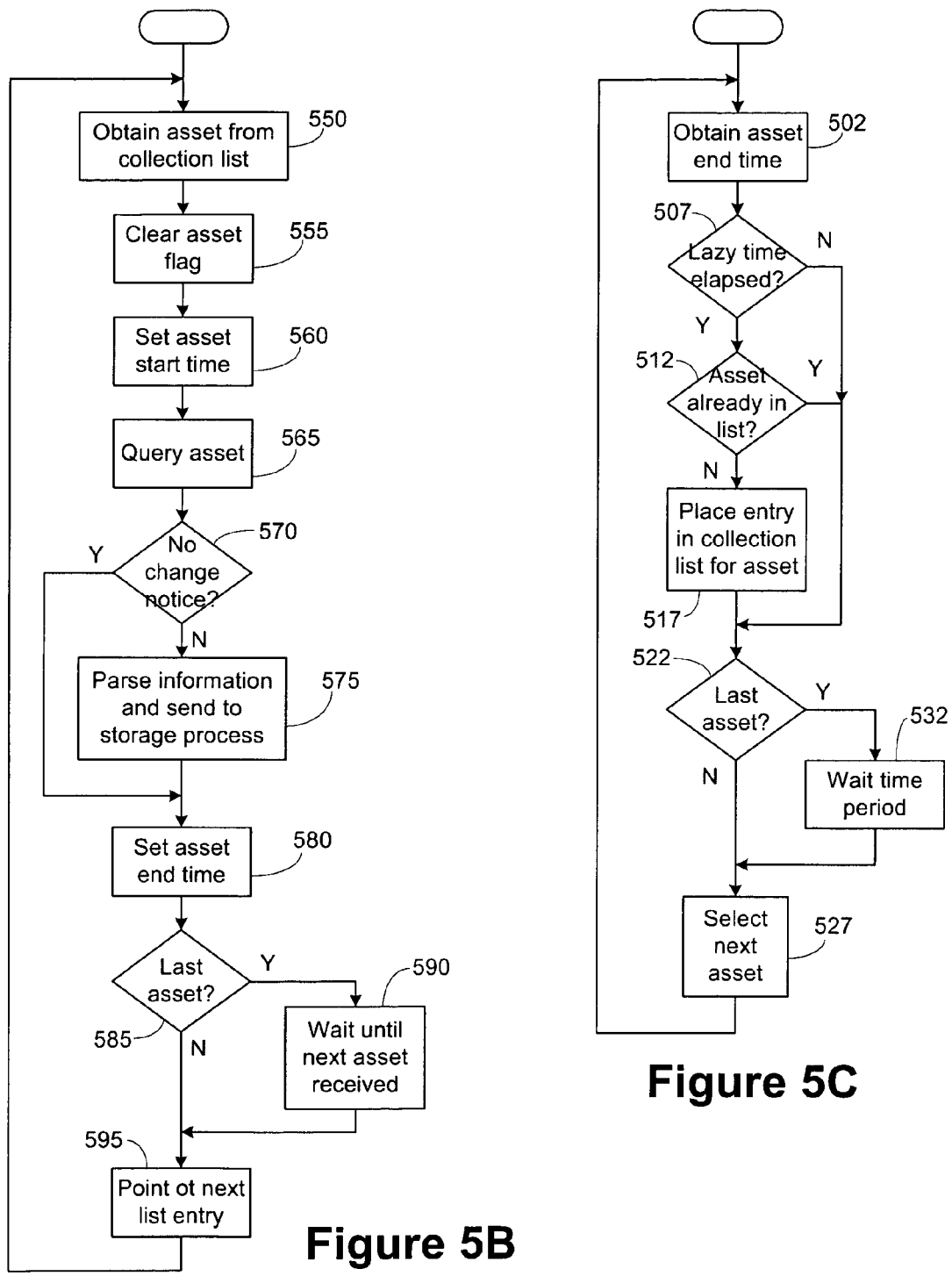

FIG. 5B illustrates the asset collection list operation. In step 550 an entry is obtained from the list 330. In step 555 the flag 310 for that asset is cleared and in step 560 the collection start time is stored for that asset. Control proceeds to step 565 where the asset is queried. Step 570 determines if the asset provided a no change indication. Some assets can provide this notice, thus simplifying operation. If a no change notice is not received, in step 575 the information is parsed and relevant portions stored. For assets like switches, this is done by comparing the received information with the stored information and any updates are made. For assets like zones, a process as described below is preferably utilized. After step 575 or if a no change notice was received in step 570, control proceeds to step 580 where the collection end time value is stored for the asset. Control proceeds to step 585 to determine if this was the last entry in the list. If so, control proceeds to step 590 to wait for an entry to be received. If not the last entry or when an entry is received, control proceeds to step 595 to point to the next entry on the list and control returns to step 550.

FIG. 5C illustrates a "lazy" polling routine. In the preferred embodiment polling is still done but effectively less often than done in the prior art. This polling is a way to double check status in case an RSCN or syslog entry was not received from the asset. In step 502, an asset collection end time value is retrieved. In step 507 a check is made to determine if a lazy interval, such as 60 minutes, has elapsed since the last asset collection ended. If so, control proceeds to step 512 to determine if the asset is currently on the collection list. If not, in step 517 the asset is placed on the list. After step 517, if the asset is already on the list in step 512 or if the lazy time has not elapsed in step 507, control proceeds to step 522 to determine if this was the last asset. If not, control proceeds to step 527 where the next asset is selected and then to step 502. If it was the last asset, control proceeds to step 532 to wait a lazy time determination period and then proceeds to step 502.

Returning now to relational artifacts, zone, AD, and metaSAN information sets are typically construed as object hierarchies. For example, a single instance of AD data in a fabric can be interpreted as an object hierarchy. Similarly, zone information is an object hierarchy, either per AD or for the entire fabric if the fabric is not AD-aware or AD-enabled. A metaSAN object hierarchy is created for each back bone fabric. Embodiments of the present invention create corresponding object hierarchies. Two object hierarchies, representing the current configuration information and the updated configuration information, may be compared using any known method. The preferred embodiment is an object tree comparison described herein to identify modified, added, and deleted nodes, represented as objects of the hierarchy. The tree comparison algorithm is independent of which type of object hierarchies is used. The only difference will be the semantic-specific helper classes.

The computed differences from the tree comparisons are preferably used as input to generate database record operation sets, records to be added, records to be deleted, and records to be updated. The algorithm is described as follows.

The object hierarchy is regarded as a tree. A single node of the tree is an object instance making that tree. Each object node is considered as properties, rendered as object attributes, and children nodes, with all nodes or child object members hanging off that node.

The comparison starts from the root node. First, object attributes are checked. Property differences are identified. Helper classes are used to compare the object attributes. Specific attributes can be excluded from comparison, if desired. An attribute can be an object of another type or a simple atomic type; comparison of these attributes is provided by helper classes.

The helper classes are used to find children of a given node. Each child is also an object instance in itself, of some type. Tree comparison is also performed on each child. This is a recursive call to the "tree comparison" procedure. For any given child, the helper class provides the id attribute value of that child as well as returning the corresponding child from the updated configuration information.

If there is a child in the stored configuration information and no corresponding child in the updated configuration information, it may be deduced that the current child is to be deleted. If the child in the stored configuration information is found in the updated configuration information, then the child is compared to find differences, both attribute differences and children differences. If the updated configuration information has more children than the stored configuration information, the additional children may be regarded as new additions.

In a preferred embodiment, once the tree comparison is completed, each difference in the comparison results in a record addition, record deletion, or a record update. In the prior art designs, the entire tree was replaced rather than just selected entries added, deleted or updated. The complete replace process of the database was slow because of the number of slow operations which had to be performed. By limiting the slow operations to only the changed records, the size of the network managed can be much larger. The network manager 220 may generate database transformations to be attached to a node from the current configuration information 240. As the comparison is processed, the same node or object may have more than one database transformation attached. The multiple database transformations are preferably superimposed to generate an appropriate end database transformation.

Figure 6B:
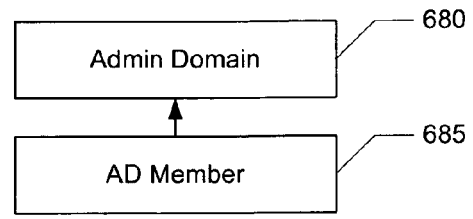
FIGS. 6A and 6B show example object types and hierarchies, zone object types in FIG. 6A and Admin Domain object types in FIG. 6B.
Figure 6A:
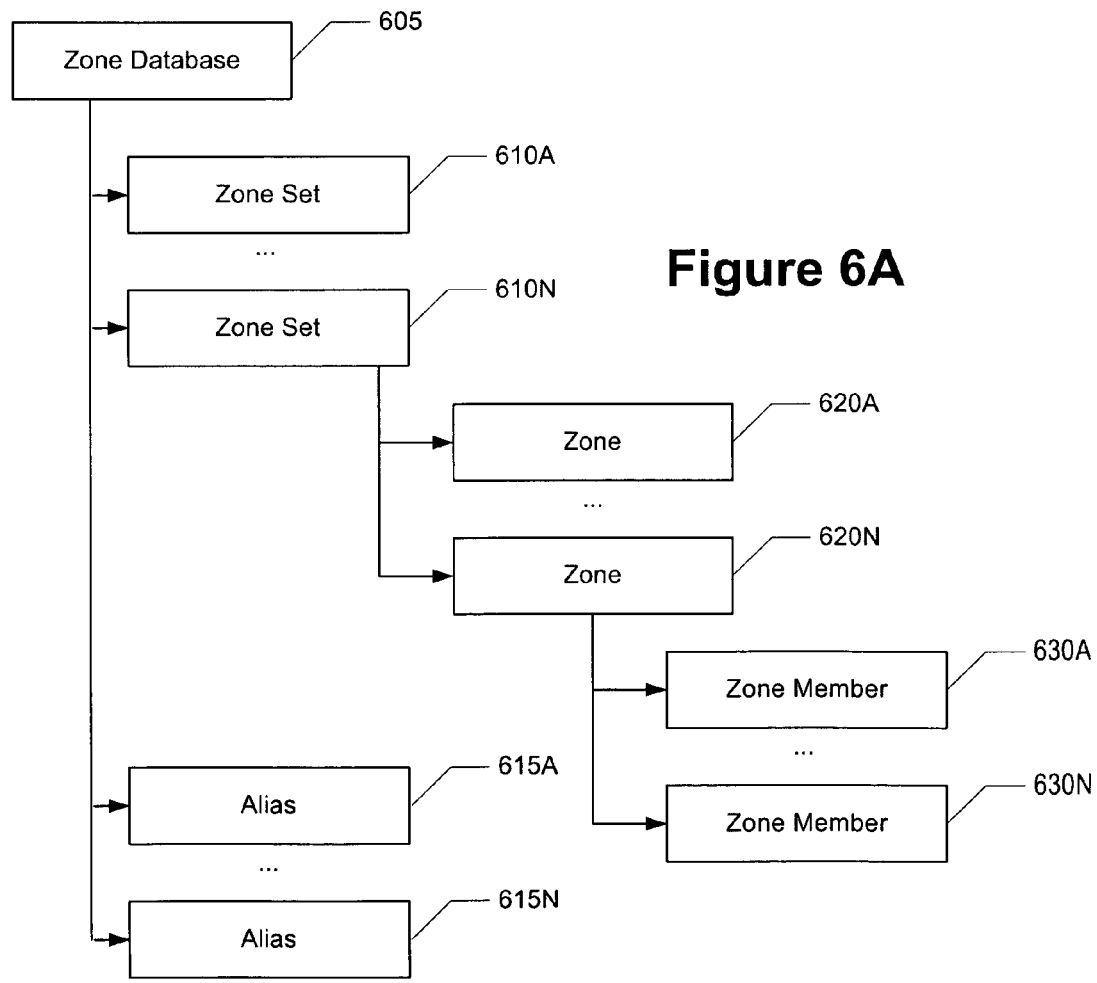
Figure 7:
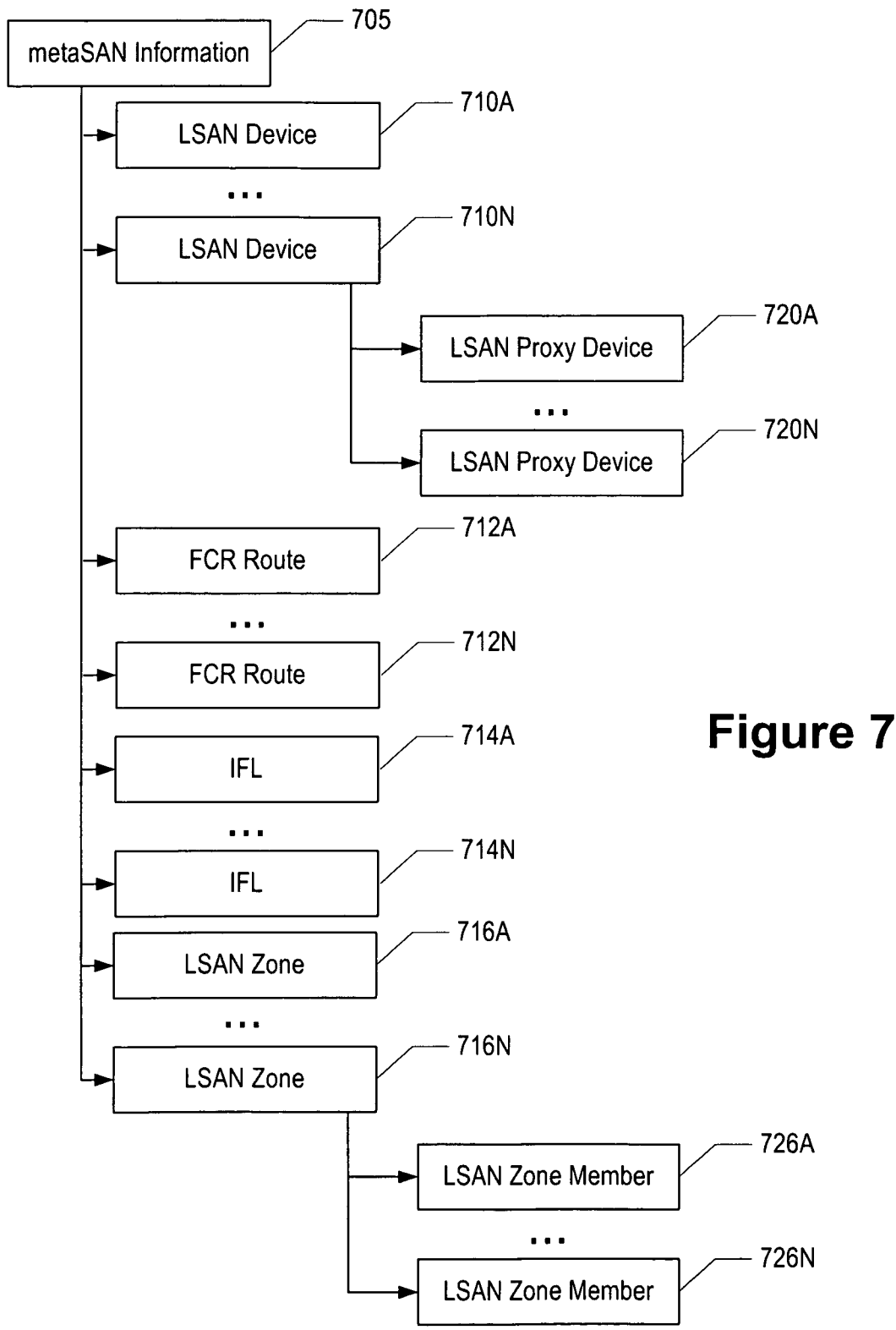
FIG. 7 shows an example object hierarchy for metaSAN information.

Turning now to FIGS. 6A, 6B, and 7, example object types and hierarchies are shown—zone object types in FIG. 6A, Admin Domain object types in FIG. 6B, and metaSAN information in FIG. 7. In FIG. 6A, the Zone Database 605 is the root. Zone Sets 610A-610N and Aliases 615A-615N are children of the root. Zones 620A-620N are shown as children of Zone Set 610N, although any Zone Set 610 may have Zones 620 as children. Zone Members 630A-630N are shown as children of Zone 620N, although any Zone 620 may have Zone Members 630 as children. In FIG. 6B, AD Member 685 may belong to one or more Admin Domains 680.

In FIG. 7, the metaSAN Information 705 is the root. LSAN Devices 710A-710N, FCR Routes 712A-712N, IFL 714A-71N, and LSAN Zones 7156-716N are children of the root. LSAN Proxy Devices 720A-720N are shown as children of LSAN Device 710N, although any LSAN Device 710 may have LSAN roxy Devices 720 as children. LSAN Zone Members 730A-730N are shown as children of LSAN Zone 716N, although any LSAN Zone 716 may have LSAN Zone Members 730 as children.

A management device according to the present invention provides both more current data and less network traffic than prior art polling schemes. The management device determines if a device or asset has changed state by receiving RSCNs or monitoring a syslog. For any received change indications a flag is placed for that asset. Periodically, a relatively short period, the flags are polled and any assets which are flagged are placed in an asset collection list. When the asset has had its data collected, a collection end time value is stored. As a separate process, a polling process scans each asset collection end time to determine if a long period, a lazy collection interval, has passed since data was last collected from the asset. If so, the asset is placed in the collection list. As the flag scan time is much smaller than the prior art polling intervals, asset data is much more current that the prior art polling techniques. As data is collected only from devices that have provided some change notification or after some longer period, overall network traffic generated by the management device is reduced.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for managing a network of devices, the method comprising:
   storing, by a management device, a state change indication that a state change may have occurred for a device other than the management device in the network based on received state change notifications about that device from devices in the network;
   determining, by the management device, if a system log entry received from another device in the network is a state change entry for the other device providing the system log entry and if so, storing a state change indication that a state change may have occurred for the other device providing the system log entry;
   determining, by the management device, if any stored state change indications are present for other devices in the network; and
   collecting, by the management device and responsive to determining if any stored state change indications are present, information from the other devices having stored state change indications.

2. The method of claim 1, wherein the step of determining if any state change indications are present is performed periodically.

3. The method of claim 1, further comprising:
   storing, by the management device, an end time value after collecting information from a device; and
   determining, by the management device, if a lazy polling period has passed since the end time value for a device and if so, collecting information from the device.

4. A network management device comprising:
   a processor;
   at least one input/output device for coupling to devices in a network; and
   a memory storing programs executed by said processor and information on the devices in the network, the programs including:
      an operating system; and
      network management software, said network management software causing said processor to execute the following steps:
         storing a state change indication that a state change may have occurred for a device other than the network management device in the network based on received state change notifications about that device from devices in the network;
         determining if a system log entry received from another device in the network is a state change entry for the other device providing the system log entry and if so, storing a state change indication that a state change may have occurred for the other device providing the system log entry;
         determining if any stored state change indications are present for other devices in the network; and
         collecting information from the other devices having stored state change indications responsive to determining if any stored state change indications are present.

5. The network management device of claim 4, wherein the step of determining if any state change indications are present is performed periodically.

6. The network management device of claim 4, said network management software further causing said processor to execute the following steps:
   storing an end time value after collecting information from a device; and
   determining if a lazy polling period has passed since the end time value for a device and if so, collecting information from the device.

7. A non-transitory computer-readable medium which stores a computer program to cause a single computer to perform the following method:
   storing a state change indication that a state change may have occurred for a device other than the single computer in a network based on received state change notifications about that device from devices in the network;
   determining if a system log entry received from another device in the network is a state change entry for the other device providing the system log entry and if so, storing a state change indication that a state change may have occurred for the other device providing the system log entry;
   determining if any stored state change indications are present for other devices in the network; and
   collecting information from the other devices having stored state change indications responsive to determining if any stored state change indications are present.

8. The non-transitory computer-readable medium of claim 7, wherein the step of determining if any state change indications are present is performed periodically.

9. The non-transitory computer-readable medium of claim 7, the method further comprising:
   storing an end time value after collecting information from a device; and
   determining if a lazy polling period has passed since the end time value for a device and if so, collecting information from the device.

10. A method for managing a network of devices, the method comprising:

receiving, by a management device, state change event notifications from other devices in the network;

storing, by the management device, a state change indication that a state change may have occurred for a device based on receiving a state change notification about that device;

receiving, by the management device, system log entries from other devices in the network;

determining, by the management device, if a system log entry is a state change entry for the other device providing the system log entry and if so, storing a state change indication that a state change may have occurred for the other device providing the system log entry;

determining, by the management device, if any stored state change indications are present for other devices in the network; and collecting, by the management device and responsive to determining if any stored state change indications are present, information from the other devices having stored state change indications.

11. The method of claim 10, wherein the step of determining if any state change indications are present is performed periodically.

12. The method of claim 11, wherein the period is relatively short.

13. The method of claim 12, wherein the period is three minutes.

14. The method of claim 10, further comprising:
storing, by the management device, an end time value after collecting information from a device; and
determining, by the management device, if a lazy polling period has passed since the end time value for a device and if so, collecting information from the device.

15. The method of claim 14, wherein the determining steps place entries in a collection list, each entry identifying an individual device, wherein consecutive entries may include non-consecutive devices, and the collection information steps utilize the entries in the collection list to select devices for information collection.

16. The method of claim 10, wherein the determining step places entries in a collection list, each entry identifying an individual device, wherein consecutive entries may include non-consecutive devices, and the collection information step utilizes the entries in the collection list to select devices for information collection.

17. A network management device for use with a network of devices, the network management device comprising: a processor;
at least one input/output device for coupling to the devices in the network; and
a memory storing programs executed by said processor and information on the devices in the network, the programs including:
an operating system; and
network management software, said network management software causing said processor to execute the following steps:
receiving state change event notifications from other devices in the network;
storing a state change indication that a state change may have occurred for a device based on receiving a state change notification about that device;
receiving system log entries from other devices in the network; and
determining if a system log entry is a state change entry for the other device providing the system log entry and if so, storing a state change indication that a state change may have occurred for the other device providing the system log entry;
determining if any stored state change indications are present for other devices in the network; and
collecting information from the other devices having stored state change indications responsive to determining if any stored state change indications are present.

18. The network management device of claim 17, wherein the step of determining if any state change indications are present is performed periodically.

19. The network management device of claim 18, wherein the period is relatively short.

20. The network management device of claim 19, wherein the period is three minutes.

21. The network management device of claim 17, said network management software further causing said processor to execute the following steps:
storing an end time value after collecting information from a device; and
determining if a lazy polling period has passed since the end time value for a device and if so, collecting information from the device.

22. The network management device of claim 21, wherein the determining steps place entries in a collection list, each entry identifying an individual device, wherein consecutive entries may include non-consecutive devices, and the collection information steps utilize the entries in the collection list to select devices for information collection.

23. The network management device of claim 17, wherein the determining step places entries in a collection list, each entry identifying an individual device, wherein consecutive entries may include non-consecutive devices, and the collection information step utilizes the entries in the collection list to select devices for information collection.

24. A network, comprising:
a plurality of interconnected devices; and
a management device coupled to the devices, the network management device comprising:
a processor;
at least one input/output device for coupling to the devices in the network; and
a memory storing programs executed by said processor and information on the devices in the network, the programs including:
an operating system; and
network management software, said network management software causing said processor to execute the following steps:
receiving state change event notifications from other devices in the network;
storing a state change indication that a state change may have occurred for a device based on receiving a state change notification about that device;
receiving system log entries from other devices in the network; and
determining if a system log entry is a state change entry for the other device providing the system log entry and if so, storing a state change indication that a state change may have occurred for the other device providing the system log entry;
determining if any stored state change indications are present for other devices in the network; and
collecting information from the other devices having stored state change indications responsive to determining if any stored state change indications are present.

25. The network of claim 24, wherein the step of determining if any state change indications are present is performed periodically.

26. The network of claim 25, wherein the period is relatively short.

27. The network of claim 26, wherein the period is three minutes.

28. The network of claim 24, said network management software further causing said processor to execute the following steps:
   storing an end time value after collecting information from a device; and
   determining if a lazy polling period has passed since the end time value for a device and if so, collecting information from the device.

29. The network of claim 28, wherein the determining steps place entries in a collection list, each entry identifying an individual device, wherein consecutive entries may include non-consecutive devices, and the collection information steps utilize the entries in the collection list to select devices for information collection.

30. The network of claim 24, wherein the determining step places entries in a collection list, each entry identifying an individual device, wherein consecutive entries may include non-consecutive devices, and the collection information step utilizes entries in the collection list to select devices for information collection.

31. A non-transitory computer-readable medium which stores a computer program to cause a single computer to perform the following method:
   receiving state change event notifications from other devices in the network;
   storing a state change indication that a state change may have occurred for a device based on receiving a state change notification about that device;
   receiving system log entries from other devices in the network; and
   determining if a system log entry is a state change entry for the other device providing the system log entry and if so, storing a state change indication that a state change may have occurred for the other device; providing the system log entry
   determining if any stored state change indications are present for other devices in the network; and
   collecting information from the other devices having stored state change indications responsive to determining if any stored state change indications are present.

32. The non-transitory computer-readable medium of claim 31, wherein the step of determining if any state change indications are present is performed periodically.

33. The non-transitory computer-readable medium of claim 32, wherein the period is relatively short.

34. The non-transitory computer-readable medium of claim 33, wherein the period is three minutes.

35. The non-transitory computer-readable medium of claim 31, the method further comprising:
   storing an end time value after collecting information from a device; and
   determining if a lazy polling period has passed since the end time value for a device and if so, collecting information from the device.

36. The non-transitory computer-readable medium of claim 35, wherein the determining steps place entries in a collection list, each entry identifying an individual device, wherein consecutive entries may include non-consecutive devices, and the collection information steps utilize the entries in the collection list to select devices for information collection.

37. The non-transitory computer-readable medium of claim 31, wherein the determining step places entries in a collection list, each entry identifying an individual device, wherein consecutive entries may include non-consecutive devices, and the collection information step utilizes the entries in the collection list to select devices for information collection.

* * * * *